May 7, 1963 C. B. KREKELER 3,088,721
RESILIENT CONTROLLING MEANS
Filed May 11, 1959 2 Sheets-Sheet 1

INVENTOR.
CLAUDE B. KREKELER,
BY Allen & Allen
ATTORNEYS.

May 7, 1963   C. B. KREKELER   3,088,721
RESILIENT CONTROLLING MEANS
Filed May 11, 1959   2 Sheets-Sheet 2

INVENTOR.
CLAUDE B. KREKELER,
BY Allen & Allen
ATTORNEYS.

United States Patent Office 3,088,721
Patented May 7, 1963

3,088,721
RESILIENT CONTROLLING MEANS
Claude B. Krekeler, Cincinnati, Ohio, assignor to The Cincinnati Mine Machinery Co., Cincinnati, Ohio, a corporation of Ohio
Filed May 11, 1959, Ser. No. 812,367
17 Claims. (Cl. 262—33)

This invention relates to the newer developments in mining machinery employing removable and renewable cutter bits. As is well known, mining machine cutter chains, and the revolving heads of other types of mining machinery, are fitted with socket members which are perforated to accept the shanks of cutter bits. The cutter bits of the class to which this invention pertains, are forgings of steel providing a head and a shank, the head normally having an insert which is a hard cutting element of tungsten carbide or other suitable material. Normally there is an abutment on the head of the cutter bit which, engaging the top of the socket member, limits the extent to which the shank may enter the perforation. While in the past it has been the practice to fasten the shanks of cutter bits in the socket members by means of set screws or more elaborate devices, the newer developments referred to involve the use of resilient control elements having a strong forward and downward reaction on the shanks of the cutter bits, and permitting constructions in which cutter bits may be installed by merely driving them into place in the socket members, and may be removed therefrom by a simple prying action.

These newer developments have made it possible for one man to remove and replace more cutter bits within a given length of time than could be handled by a crew of two men using the old constructions.

A type of resilient control means which is admirably adapted for the purpose is set forth in the copending application of this inventor, Serial No. 728,476, filed April 14, 1958, now Patent No. 2,965,365 and entitled Bits and Holding Means Therefor. In this structure a hole is bored transversely of the socket member and in such a way as to intersect the perforation therein. Extending from outer side to outer side of the socket member through this hole there is a structure comprising a hard metal rod encased in a rubbery resilient substance. The hole is so formed that at least a part of the rod will lie within the perforation of the socket member; and that portion of the rubbery resilient body surrounding the rod, which would normally lie within the perforation of the socket member, is cut away or removed so that the rod is exposed therein. The rod is displaceable in various directions but only against the resistance of the rubbery substance of the body, which resistance is very great. The shank of the cutter bit is formed on its rear edge with an operating surface, usually a part of a notch, so that the rod of the resilient controlling means, contacting said surface can exert a powerful forward and downward force on the shank. The bit is installed by a driving action, the pin being displaced until it can contact the said operating surface, the lower rear corner of the bit shank being sloped or configured to permit the initial displacement of the rod. When a bit is to be changed it is pried out of the socket member, the operating surface of the shank acting in this instance to displace the rod of the resilient controlling means.

This application deals with improvements in the manufacture of resilient controlling devices of this general type; and one of the objects of the invention is to provide a way in which such resilient controlling means may be more readily made in an operation in which the rubbery resilient substance is molded about the steel pin.

Another object of the invention is the provision of improvements in the structure of resilient controlling means such that the controlling means operate more perfectly in use while retaining the advantage of ready replaceability, and such that the resilient controlling means will have a longer service life.

These and other objects of the invention which will be set forth hereinafter or will be apparent to one skilled in the art upon reading these specifications are accomplished by that construction and arrangement of parts and in that procedure of which certain exemplary embodiments will now be described. Reference is made to the accompanying drawings wherein:

FIG. 7 is a transverse sectional view taken along the section line 7—7 of FIG. 6.

Figure 1:
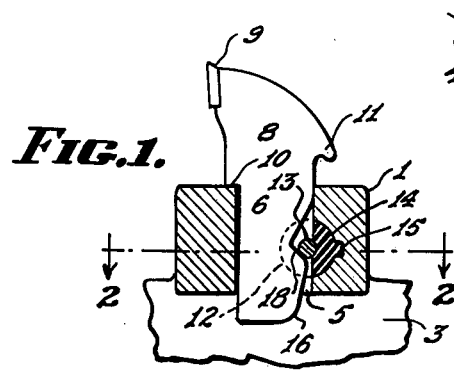
FIG. 1 is a longitudinal sectional view through a socket member and resilient controlling means, showing a bit retained in the socket by the resilient controlling means.

A consideration of FIGS. 1 and 2 will provide an understanding of the general nature of resilient controlling means of the type hereinabove referred to, and their coaction with a socket member and a cutter bit. A socket member is indicated at 1; and it may be a part of a chain link 3 of a mining machine cutter chain, or it may be a part of a rotating cutter head in other types of mining machinery. The socket member has a perforation 5 to accept the shank 6 of a cutter bit. The cutter bit illustrated is a forked steel structure in which the shank 6 is integral with a head 8 provided with a cutting point 9 of some hard alloy as is well understood in this art. The head 8 has an abutment 10 to limit the distance to which the shank may enter the perforation 5, thus to establish the gauge of the bit. The bit head also has a slightly undercut shoulder 11 positioned above the top surface of the socket member 1 so that the bit may be withdrawn from the socket member by the prying action of a suitable tool. A suitable tool is shown in the copending application of the present inventor entitled Means for the Removal and Installation of Cutter Bits in Mining Machinery, Serial No. 811,167, filed May 5, 1959.

A hole 12 is formed transversely of the socket member 1 so as preferably to extend through it from side to side, and so positioned as to intersect the perforation 5. In this hole there is placed a resilient controlling means consisting essentially of a steel pin or rod 13 encased in a body 14 of resilient substance. As will be apparent from FIG. 2 the resilient substance is cut away at the central part of the resilient controller, i.e. the part coinciding with the perforation 5 so as to expose the pin; and the configuration of the parts is such that the central portion of the pin will normally lie at least partially within the perforation of the socket member, while being displaceable in various directions because of the resilience of the rubbery body 14. A ridge 15 formed on the rear of the resilient controlling means, and lying within a groove broached in connection with the hole 12, prevents the rotation of the resilient controlling means.

Figure 2:
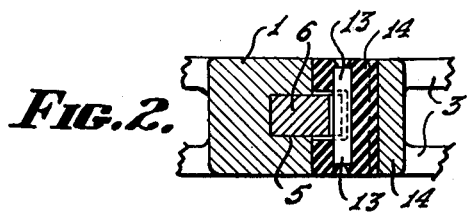
FIG. 2 is a horizontal section taken along the section line 2—2 of FIG. 1.

When a bit is to be installed the end portion of its shank is introduced into the perforation of the socket member, whereupon the bit may be driven home to the position shown in FIG. 1 by a blow of sufficient force. The lower rear corner of the bit shank 6 is chamfered, sloped or rounded as at 16 to displace the pin 13 until the pin can engage an operating surface 18 usually formed as part of a notch in the bit shank and lying aslant to the axis of the shank. As shown in FIG. 1 the engagement of the pin 13 with the operating surface 18 of the bit shank under the resilient action of the rubbery body 14, will produce a strong downward and forward force on the shank. The operating surface 18 will deflect the pin to permit removal of the bit when an upward force of sufficient magnitude is exerted upon the bit shoulder 11.

While other constructions are possible it is preferred to rely on a frictional engagement of the resilient controlling means in the hole 12 in the socket member, rather than to attempt to use end fastening devices for the resilient controlling means. In use the resilient controlling means is restrained from longitudinal displacement because of the shoulders on the resilient body 14 formed by cutting the central portion of it away as hereinabove described. Thus the resilient controlling means are readily renewable in the combination illustrated. When there is no bit shank in the perforation 5 the resilient controlling means may simply be pushed out of the hole 12 and another such means inserted therein.

Figure 4:
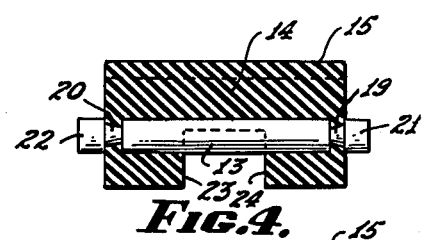
FIG. 4 is a longitudinal sectional view thereof taken along the section line 4—4 of FIG. 3.
Figure 5:
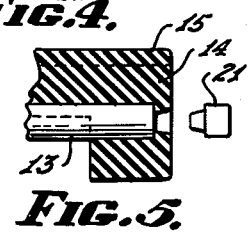
FIG. 5 is a partial sectional view taken along the same line and showing the removal of an end portion of the pin.

The resilient controlling means is preferably made by molding a suitable rubbery resilient substance about the pin 13. While the pin may have other cross sectional shapes it is preferably cylindrical in form. It is somewhat difficult to locate such a pin within a mold in which the rubbery resilient material is to be formed about it, since in the finished articles the pin should not extend beyond the ends of the resilient body. This invention contemplates a means of avoiding the difficulty. As most clearly illustrated in FIG. 4 the pin is made longer than the resilient body; and the pin is necked down as at 19 and 20 at positions adjacent its ends and lying within the confines of the rubbery body which is to be formed in the mold. The necking down may be accomplished by a turning or grinding operation. In the way illustrated extending end portions 21 and 22 are provided which may be engaged in cavities in the mold so that the pin will be fixedly located therein. After the molding operation these end portions may be broken off as illustrated in FIG. 5 thus providing a resilient controlling means in which the pin does not extend beyond the ends of the resilient body.

The resilient body may be formed from natural rubber, any of the synthetic rubbers, or of a chloroprene. The rubbery body must be resilient and deformable to permit displacement of the pin; but it is within the skill of the worker in the art to control the stiffness or resistance to deformation of the rubbery substance so as to vary the force required to displace the pin in the combination illustrated in FIGS. 1 and 2.

Figure 3:
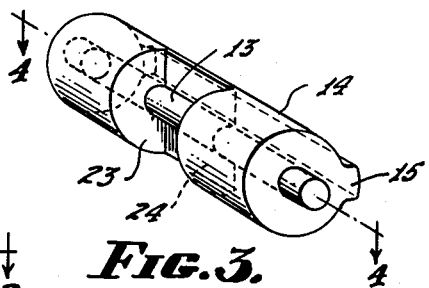
FIG. 3 is a perspective view of an exemplary form of resilient controlling means.

Since the resilient controlling means fits the hole 12 frictionally, the assembly is not much affected by acidic mine waters, and cutting fines cannot enter the hole 12 from the outside. The resilient rubbery substance moreover is not subject to any rapid deterioration. Thus a resilient controlling means will outlast very many cutting bits. Acidic mine waters can attack the exposed central portion of the pin 13; but it has been found in practice that the primary cause of failure of the resilient controlling means thus far described is due to a peculiar action of fines entering the socket perforation 5 alongside the bit shank. These fines have a tendency to accumulate and exert outward pressure on the shoulders of the rubbery body 14 (see the shoulders 23 and 24 in FIGS. 3 and 4). Accumulating pressure against these shoulders may force the forward end portions of the resilient body outwardly causing them to protrude beyond the outer surfaces of the socket member 1. If the end portions so protrude, they may be subject to heavy abrasion, and in some instances may interfere with the passage of a socket member about a cutter arm, or engage any other mechanical element in a mining machine which lies near the outer edges of the socket member. In exaggerated instances end portions of the resilient body may break away.

Figure 6:
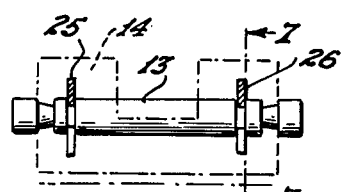
FIG. 6 is an elevational view of a pin fitted with means to prevent longitudinal spreading, the body of resilient substance being shown in dotted lines.

This invention contemplates means for resisting or preventing the longitudinal spreading of end portions of the resilient body. One such means is illustrated in FIGS. 6 and 7. Here the pin 13 has been grooved at points adjacent the ends of the pin in the finished article, and washer-like members 25 and 26, cut out centrally and at one side. These engage in the grooves as will be clear from the drawings and inhibit the spreading of end portions of the resilient body 14. The showing of FIGS. 6 and 7 is exemplary of anti-spreading means which have a connection with the pin; and the skilled worker in the art will understand that anti-spreading means of varying shapes and sizes may be engaged with or even fastened to end portions of the pin as by welding or the like.

Figure 8:
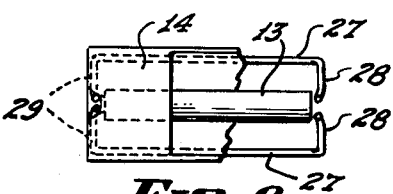
FIG. 8 is an elevational view of one form of reinforced resilient controlling means, the body of resilient substance being cut away at one end.
Figure 9:
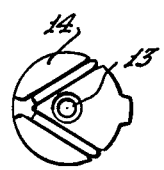
FIG. 9 is an end view of the structure of FIG. 8.
Figure 10:
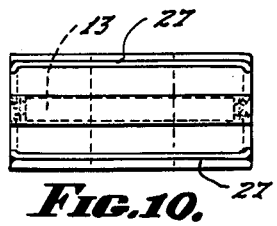
FIG. 10 is an elevational view from the rear of the structure of FIG. 8.

Under some circumstances anti-spreading means which are attached to the pin may have the disadvantage of interfering to some extent with the distortion of the rubbery mass when the pin is forcibly moved by the shank of the cutter bit. As a consequence devices which are free of any connection with the pin and which are so located as not to interfere with the necessary distortion of the rubbery mass are preferred. An example of this kind is illustrated in FIGS. 8, 9 and 10. The means used to prevent spreading comprise members formed of stiff wire, each of these members having a longitudinally extending portion 27 and turned over end portion 28 and 29. The rubbery body 14 may be molded with longitudinal and end grooves as clearly illustrated in these figures and the reinforcing members may be installed after the formation of the otherwise complete resilient controlling means. It will be noted that any longitudinally extending portions of the reinforcing means must lie to the rear side of the controlling means so as to leave the central portion of the pin 13 free for engagement with the shank of the cutter bit. End portions of the parts 28 and 29 of the reinforcing structures may advantageously be bent slightly inwardly as shown.

Figure 11:
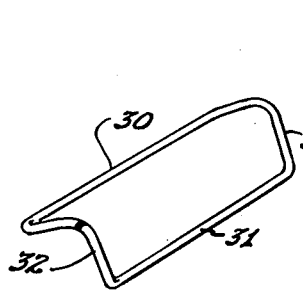
FIG. 11 is a perspective view of a wire reinforcement member.
Figure 12:
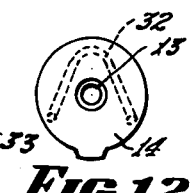
FIG. 12 is an end elevational view of a resilient controlling means embodied in the reinforcement shown in FIG. 11.
Figure 13:
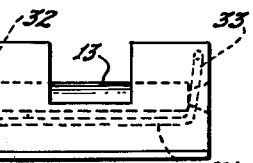
FIG. 13 is a plane view of the same structure.
Figure 14:
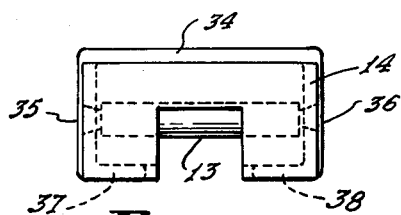
FIG. 14 is a plane view of a resilient controlling means embodying another form of reinforcement.
Figure 15:
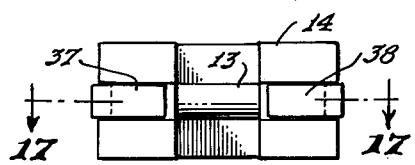
FIG. 15 is a front elevational view thereof.
Figure 16:
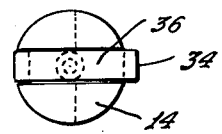
FIG. 16 is an end elevational view thereof.
Figure 17:
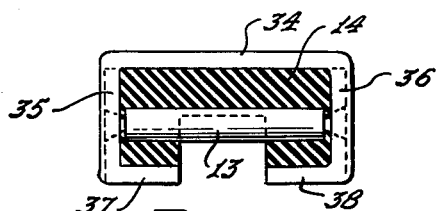
FIG. 17 is a sectional view taken along the section line 17—17 of FIG. 15.

A preferable reinforced structure is obtained when reinforcing means is molded within the rubbery body 14. A reinforcing means well adapted for this purpose is illustrated in FIG. 11 and shown in use in FIGS. 12 and 13. The reinforcing means is in this instance a closed loop or rectangle of stiff wire having longitudinal elements 30 and 31 and lateral elements 32 and 33, the lateral elements being bent into a V-shape. Such a structure may be placed in a mold along with the pin 13 and the rubbery body 14 molded about the other parts so that as clearly shown in FIGS. 12 and 13 the reinforcing means becomes wholly embedded in the resilient body. The angularly related lateral portions 32 and 33 act to prevent spreading of end portions of the body.

The best and strongest structure for the purpose thus far devised, is illustrated in FIGS. 14 to 17 inclusive. Here the reinforcing device is a member formed of hard metal such as steel, preferably though not necessarily rectangular in cross section, but having sufficient cross sectional area to be very stiff and strong. The device comprises a longitudinal portion 34 and related portions 35 and 36, end portions of which are inwardly turned as at 37 and 38. The resilient controller comprising the pin 13 and rubbery body 14 may be made as hereinabove described in connection with FIGS. 4 and 5; and the body may be grooved to accept the various portions 34 to 38 of the anti-spreading means. The anti-spreading means may thus be engaged with the resilient controller after its formation; but it is equally possible to locate the anti-spreading means in a mold and form the rubbery resilient body about it and about the pin. In a preferred structure the rubbery body 14 is not grooved on its rear side but the longitudinal portion 34 of the anti-spreading means extends beyond the periphery of the resilient body and serves in lieu of the rib 15 to prevent rotation of the resilient controlling means in use.

Figure 18:
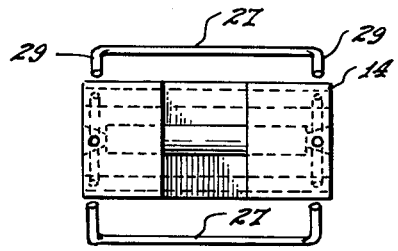
FIG. 18 is an exploded view of a resilient controlling means and certain reinforcements which may be assembled to it.
Figure 19:
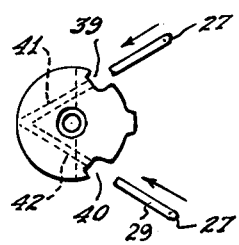
FIG. 19 is a similar end elevational view.
Figure 20:
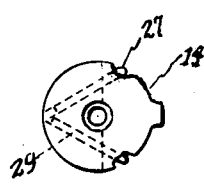
FIG. 20 is an end elevational view showing the resilient controlling means in complete assembly.

Another modification is shown in FIGS. 18 to 20. This is analogous to what is shown in FIGS. 8 to 10, and uses the same type of anti-spreading means. But the resilient body 14 is provided with rear grooves 39 and 40 to accept the longitudinal portions 27 of the reinforcing means, and is also provided with holes indicated at 41 and 42. The bent over portions 28 and 29 are thrust into these holes as will be clear from the figures. The advantage of this structure over the structure of FIGS. 8 to 10 is that the end portions of the stiff wire reinforcements are embedded in the rubbery body so that there is no danger of these end portions catching on objects passing close to the outer side surfaces of the socket member 1.

Modifications may be made in the invention without departing from the spirit of it. The invention having been described in certain exemplary embodiments what is claimed as new and desired to be secured by Letters Patent is:

1. A resilient holding element for the purpose described comprising a rigid elongated metallic pin, a body of rubbery resilient substance encasing said pin excepting at a central portion of the resilient holding means where said pin is exposed at least in part, and metallic means in connection with said body of rubbery resilient substance and located in part at least within the confines of the outer periphery of said body to inhibit the spreading of end portions thereof in the direction of the axis of said pin.

2. The structure claimed in claim 1 wherein said last mentioned means comprises elements engaged with end portions of said pin and extending in a direction transverse the axis thereof.

3. The structure claimed in claim 1 wherein said last mentioned means comprises at least one metallic member having a tying portion extending longitudinally of said pin, and end portions extending at an angle to said tying portions and engaging end portions of said body of rubbery resilient substance.

4. A resilient holding means for the purpose described comprising an elongated rigid metallic pin encased in a body of rubbery resilient substance excepting at a central portion of said pin where said body is cut away at one side of said pin to expose it, the body on the other side being continuous from end to end, and means for inhibiting the spread of end portions of said body in the direction of the axis of said pin, said means comprising at least one wire member having a longitudinal portion extending in the direction of the length of said body and located within the confines of the periphery of said body, and integral ends on said wire member extending at an angle to said longitudinal portion and engaging end portions of said body.

5. A resilient holding means for purpose described comprising an elongated pin encased in a body of rubbery resilient substance excepting at a central portion where said body is cut away at one side to expose said pin at least in part, and metallic means divorced from said pin and associated with said body to prevent spreading of end portions of said body in the direction of the axis of said pin, said metallic means being engaged with said body in such a way as not to extend beyond the peripheral confines thereof.

6. The structure claimed in claim 5 wherein said means for preventing spread of end portions of said body comprises a wire element in the form of a loop having substantially parallel longitudinal portions and bent connecting portions at the ends thereof, said element being wholly imbedded in said resilient body.

7. A resilient holding means for the purpose described comprising an elongated rigid metallic pin encased in a body of rubbery resilient substance of substantially cylindrical contour excepting at a central portion of said pin where said body is cut away at one side to expose said pin, and metallic means divorced from said pin and having a longitudinally extending tying portion and angularly related ends associated with end portions of said body to minimize the spreading thereof, said metallic member lying in grooves formed in said body so as not to project beyond the peripheral confines thereof.

8. A resilient holding means for the purpose described comprising an elongated rigid metallic pin encased in a body of rubbery resilient substance and of generally cylindrical contour excepting at a central portion of said pin where said body is cut away at one side to expose said pin, and means for inhibiting the spreading of end portions of said body in the direction of the axis of said pin, said means comprising a metallic member having a tying portion extending longitudinally of said body, and end portions lying at an angle thereto and crossing the ends of said body at a position beyond the ends of said pin.

9. The structure claimed in claim 8 including inturned portions on said angularly related portions.

10. The structure claimed in claim 8 wherein said angularly related portions of said metallic member are located in grooves formed in said body so as not to extend beyond the peripheral confines thereof.

11. The structure claimed in claim 9 wherein said angularly related portions and inturned portions of said metallic member are located in grooves formed in said body so as not to extend beyond the peripheral confines thereof.

12. The structure claimed in claim 9 wherein said angularly related portions and inturned portions of said metallic member are located in grooves formed in said body so as not to extend beyond the peripheral confines thereof, and in which the said longitudinally extending portion lies outside the peripheral confines of said body whereby to provide a key to prevent rotation of said body within an orifice in a socket member, where said orifice has a key-way to accept said key.

13. A resilient holding means for the purpose described comprising an elongated rigid metallic pin encased in a body of rubbery resilient substance of substantially cylindrical contour excepting at a central portion of said pin where said body is cut away at one side to expose said pin, and a pair of substantially rigid wire elements having angularly related ends and longitudinal tying portions engaged with said body in such a way that the angularly related ends thereof inhibit spreading of end portions of said body in the axial direction of said pin.

14. The structure claimed in claim 13 wherein said angularly related end portions of said wire members are thrust into holes in end portions of said body, the longitudinal tying elements of said wire members lying in grooves in said body.

15. A resilient holding means for the purpose described comprising an elongated rigid metallic pin encased in a substantially cylindrical body of rubbery resilient material excepting at a central portion of said pin where said body is cut away at one side to expose said pin, said pin having grooves near its end portions and washer-shaped elements encased in said grooves and wholly embedded in end portions of said body.

16. A resilient holding means for the purpose described, comprising an elongated rigid metallic pin, said pin lying within a body of rubbery resilient substance molded thereabout, said body encasing said pin excepting at a central portion of said pin where said body is cut away at one side to expose said pin, the ends of said pin lying inside the ends of said body of rubbery resilient substance and covered in part thereby.

17. A resilient holding means for the purpose described, comprising an elongated, rigid, metallic pin encased in a body of resilient substance of generally cylindrical contour excepting at a central portion of said pin where said body is cut away at one side to expose said pin, end portions of said body completely surrounding end portions of said pin, said pin having adjacent its ends but wholly within the end portions of said resilient body, metallic parts fixed axially with respect to said pin and having a larger effective diameter than the diameter of said pin.

References Cited in the file of this patent
UNITED STATES PATENTS

| | | |
|---|---|---|
| 1,823,168 | Read | Sept. 15, 1931 |
| 2,529,348 | Mustee | Nov. 7, 1950 |
| 2,766,029 | Bruestle | Oct. 9, 1956 |
| 2,965,365 | Krekeler | Dec. 20, 1960 |